United States Patent
Kim

[11] Patent Number: 5,972,528
[45] Date of Patent: *Oct. 26, 1999

[54] BARRIER IN COLOR PLASMA DISPLAY PANEL

[75] Inventor: Kun Woo Kim, Kumi-si, Rep. of Korea

[73] Assignee: LG Electronics, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,866

[22] Filed: Feb. 6, 1997

[30] Foreign Application Priority Data

Aug. 20, 1996 [KR] Rep. of Korea ............ 96/34416

[51] Int. Cl.$^6$ ............................................. B32B 9/00
[52] U.S. Cl. ................. 428/697; 313/268; 313/292; 313/584; 313/585; 313/586; 427/126.3; 428/702; 428/704
[58] Field of Search ................ 313/584, 585, 313/586, 268, 292; 427/126.3; 428/697, 702, 704

[56] References Cited

U.S. PATENT DOCUMENTS

| | | | |
|---|---|---|---|
| 3,678,322 | 7/1972 | Souri | 313/201 |
| 4,948,758 | 8/1990 | Beall et al. | 501/3 |
| 5,182,489 | 1/1993 | Sano | 313/485 |
| 5,701,056 | 12/1997 | Shinohara | 313/584 |

*Primary Examiner*—Bernard Pianalto
*Attorney, Agent, or Firm*—Fish & Richardson P.C.

[57] ABSTRACT

Barrier in a color plasma display panel (PDP) and a method for manufacturing the same are disclosed; the partion of the color plasma display panel (PDP) including a barrier formed of frit glass between upper and lower substrates each having electrodes of a regular interval for making a cell; and the method including the steps of coating a frit glass paste of a predetermined thickness on the lower substrate, drying and baking the coated frit glass paste to form a frit glass, defining unnecessary portions on a surface of the frit glass, and removing the unnecessary portions of the frit glass to form frit glass barriers spaced regular intervals apart from one another.

23 Claims, 2 Drawing Sheets

BARRIER IN COLOR PLASMA DISPLAY PANEL

BACKGROUND OF THE INVENTION

1. Field of the Invention

The present invention relates to a color plasma display panel (PDP), and more particularly, to a barrier in a color PDP and a method for manufacturing the same.

2. Discussion of the Related Art

FIG. 1 is a cross-sectional view showing a structure of a conventional color PDP.

Referring to FIG. 1, a color PDP includes an upper substrate and a lower substrate.

The lower substrate includes a lower glass substrate 10, a first insulating layer 11 for preventing an electrode material from penetrating into the lower glass 10 on baking, a lower electrode 12 on the first insulating layer 11, and barriers 13 for preventing crosstalk between cells adjacent to the lower electrode 12.

The upper substrate includes an upper glass substrate 15, a second insulating layer 16, a plurality of upper electrodes 17 on the second insulating layer 16, first and second dielectric layers 18 and 19 for maintaining surface charge generated in discharge of the upper electrode 17, and a protecting layer 20 for preventing damage of the first and second dielectric layers.

A luminescent material 14 is formed on the barriers 13 and over the lower glass substrate 10.

A mixed gas of argon and neon is injected to the space between the upper substrate and the lower substrate as to become non-active gas of a plasma state, thereby forming a discharge region.

A method for manufacturing a color PDP having the above-described structure will be discussed.

First, a first insulating layer 11 is formed on a transparent lower glass substrate 10 in order to prevent an electrode material from penetrating into the lower glass substrate 10 on baking.

Secondly, a lower electrode 12 is formed on the insulating layer 11 and then dried and baked. Next, after completing the drying and the baking of the lower electrode 12, a barrier material is printed over the lower glass substrate 10 about 10–13 times by a printing process in order to prevent color mixture between adjacent discharge cells, thus forming barriers 13 by drying and baking.

One of typical methods for forming barriers employs a thick film printing technique. In this method, the barriers are formed not by etching the barrier material but by printing it on a predetermined region a plurality of times. In the method of printing a thick film, utilizing a screen mask, a mixed paste mixed with ceramic powder and organic binder solvent is printed and dried 10 times and then baked at a temperature of 450–700° C., thereby forming barriers. In this case, each time the barrier material is printed, the barriers grow 13–15 $\mu$m thick. Thus, the total thickness of the barrier is 130–150 $\mu$m. A material for forming the barriers is an insulating paste.

Subsequently, a luminescent material is formed on the lower electrode 12 and the barriers 13, thus completing the lower substrate 12.

As for the upper substrate, on the transparent upper glass substrate 15, there is formed a second insulating layer 16 on which upper electrodes 17 are formed. At this time, the upper electrodes 17 is a transparent electrode (ITO: indium-tin oxide) which is formed by depositing indium oxide and tin-oxide. Alternatively, a stacked metal electrode composed of three layers which are chromium-copper-chromium, can be used as the transparent electrode, thus improving voltage decrease.

Next, in order to drop a driving voltage by charge generated at the interface, first and second dielectric layers 18 and 19 are formed. Then, a protecting layer 20 is formed on the second dielectric layer 19 to prevent damage of the first and second dielectric layers 18 and 19.

Thereafter, the upper and lower substrates are sealed by means of a sealant, so as to form a sealed space. Then, a discharge gas is sealed within the sealed space. A hole (not shown) made in a corner of the bottom of the sealed space is connected to a glass tube (not shown) for gas injection, so that the gas sealed within the sealed panel is taken out. When the gas is taken out, the vacuum degree is generally $10^{-6}$–$10^{-8}$ torr.

The gas is injected (about 500 torr) by means of a gas injection equipment and then the glass tube is sealed by heat, thus forming a panel which completely seals the discharge gas.

In such a conventional method for manufacturing barriers of a color plasma display, it is difficult to manufacture barriers of a desired quality by repeatedly printing a barrier material about 10 times. Further, since a baking temperature of the paste which is a barrier material is high, the upper and lower glass substrates are necessary to be annealed, or a special substrate has to be used, in order to prevent the quality decrease caused by variation of the glass dimension. Furthermore, due to limitations of the screen mask used for a printing, the barriers of the color PDP is not useful for any color PDP of a large size.

SUMMARY OF THE INVENTION

Therefore, the present invention is directed to barriers of a color PDP and a manufacturing method thereof that substantially obviate one or more of problems due to limitations and disadvantages of the related art.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the barrier in the color plasma display panel (PDP) includes a barrier formed of frit glass between upper and lower substrates each having electrodes of a regular interval for making a cell.

In another aspect of the present invention, there is provided a method for manufacturing barriers of a color plasma display panel (PDP) including the steps of: coating a frit glass paste of a predetermined thickness on the lower substrate, drying and baking the coated frit glass paste to form a frit glass, defining unnecessary portions on a surface of the frit glass, and removing the unnecessary portions of the frit glass to form frit glass barriers spaced regular intervals apart from one another.

It is to be understood that both the foregoing general description and the following detailed description are exemplary and explanatory and are intended to provide further explanation of the invention as claimed.

BRIEF DESCRIPTION OF THE DRAWINGS

These and various other objects, features, and advantages of the present invention will be readily understood with reference to the following detailed description read in conjunction with the accompanying drawings, in which:

FIG. 1 is a cross-sectional view showing a unit cell structure of a conventional color PDP.

DETAILED DESCRIPTION OF THE PREFERRED EMBODIMENTS

Reference will now be made in detail to the preferred embodiments of the present invention, examples of which are illustrated in the accompanying drawings.

Figure 1:
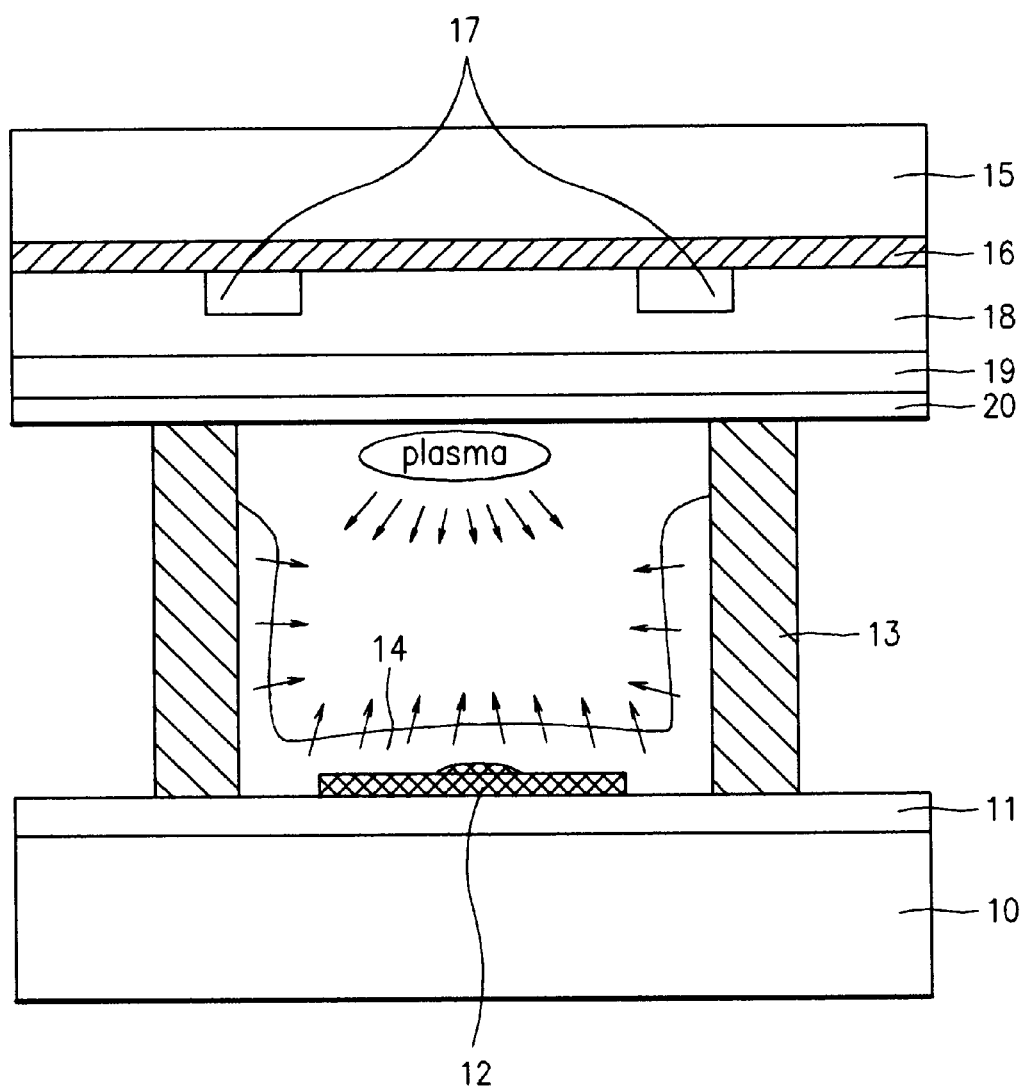
Figure 2:
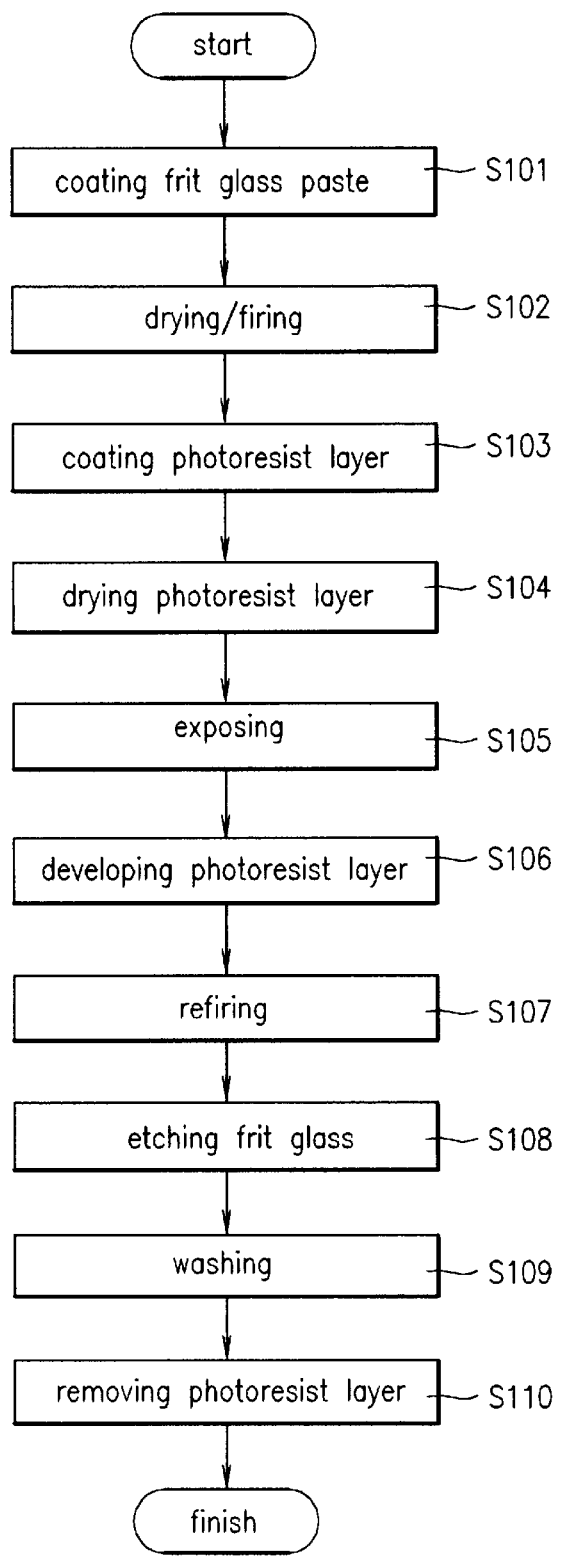
FIG. 2 is a flow chart showing a manufacturing process of barriers of a color Plasma display panel according to the invention.

FIG. 2 is a flow chart showing a manufacturing process of barriers of a color Plasma display panel (PDP) according to the invention.

Referring to FIG. 2, a 100–200 μm thick frit glass paste, which is made by mixing frit glass powder and a vehicle, is uniformly coated on the entire surface of a lower glass substrate 10 by employing a printing technique (S101). Herein, the main component of the frit glass power, which is a glass of a crystallinity of a low melting point, is lead oxide (PbO).

If the frit glass powder is heat-treated at not less than the temperature of its softening point, it, unlike a general glass of a low melting point, melts again at a temperature 100° C. higher than the baking temperature, even after the crystallization caused on the first baking. Because the frit glass powder is not changed at a temperature less than 100° C. higher than the baking temperature, its characteristics are excellent.

Prior to baking, the frit glass powder is melted at a relatively low temperature of 370–380° C. and thus it is firmly fixed in a glass state. Yet, if it is heat-treated after fixing, the frit glass begins to crystallize from its surface. The crystallized glass remain in a strong solid state at a temperature of less than about 500° C. at which point the crystal of the frit glass begins to melt.

As the process of the heat-treatment after the formation of the barriers, there are a process of baking the luminescent material and a process of depositing a sealant. Both of the two process are carried out at a temperature of 400–450° C. so that there is no possibility for the barriers of frit glass power to melt to have a changed form.

Also, a black frit glass added to by a pigment is employed to improve the contrast of the color plasma display panel (PDP) The pigment employed to make the frit glass black-colored is a mixture of ferric oxide ($Fe_2O_3$) and cobalt oxide ($Co_2O_3$). The pigment mixture is 0.4–0.6 wt % of the total amount. In the frit glass, lead oxide (PbO) is 70–80 wt %, boric oxide ($B_2O_3$) is 8–13 wt %, zinc oxide (ZnO) is 7–12 wt %, silicon oxide ($SiO_2$) is 3 wt %, and barium oxide (BaO) is 1 wt %. The heat expansion coefficient varies according to the amount of BaO. As the amount of BaO is increased, the heat expansion coefficient increases.

The 100–200 μm thick frit glass paster which has uniformly formed on the lower glass 10, is dried and then baked at a temperature of 430–450° C. (S102).

Subsequently, on the frit glass paste which has been dried and baked, there is coated a photoresist film (S103), which is dried to have a specific moisture level (S104).

Next, utilizing a pattern mask, the dried photoresist film is subjected to exposure (S105) and then development (S106). Then the photoresist film is baked again at a temperature of less than 150° C. (S107) in order to prevent the photoresist layer from being damaged by a strong acid etchant. Next, the unnecessary frit portion of the glass is removed by etching (S108). In this case, the photoresist film used is a commercially available positive photoresist film to remove the exposed portions. The echant used is a wet etchant which is made by diluting acid.

Sulfuric acid, hydrochloric acid, fluoric acid, or nitric acid can be used as an etchant. Among them, nitric acid is most commonly used.

The frit glass is dipped or sprayed to be etched. The optimal temperature for etching is 35–50° C. and the concentration of the nitric acid is diluted by water to be 25–55%. The time of the etching is 1–5 min.

It is difficult to achieve a desired pattern width of the barriers which is under-cut. The under-cut commonly happens on etching by using an etchant. When the frit glass is etched by a predetermined depth, its upper portion is etched laterally. Thus, the upper portion is etched more than the lower portion, so that the pattern width of its upper portion is narrower than that of its lower portion. Etching is more uniform when the etching is carried out by spraying method rather than dipping, so that the under-cut amount can be reduced. In particular, the etching time can be reduced and the under-cut amount can be reduced when a temperature of the etchant is higher than 35° C. Also, the higher the concentration of the acid, the less the amount of the under-cut.

After finishing etching the frit glass, the frit glass is washed (S109) and then the remaining photoresist layer is removed (S110).

The method of the invention has several advantages. Since the amount of variation of barriers can be decreased by reducing the temperature of baking a barrier material, performances of a PDP are improved, the time of baking is shortened, and heat shock inflicted on the glass is reduced. Further, the overall process is simplified and the material cost is decreased, thereby improving the product competitiveness. Accordingly, a large-size PDP of a high resolution can be conveniently manufactured by using the method of the invention. Also, since the amount of the under-cut can be reduced, the method can be applied to barriers of a color PDP of a low resolution.

It will be apparent to those skilled in the art that various modification and variations can be made in the barriers of a color PDP and the manufacturing method thereof of the present invention without departing from the spirit or scope of the inventions. Thus, it is intended that the present invention cover the modifications and variations of this invention provided they come within the scope of the appended claims and their equivalents.

What is claimed is:

1. A color plasma display panel (PDP) comprising:
    a barrier formed of frit glass between an upper substrate and a lower substrate, the upper substrate and lower substrate having electrodes of a regular interval for making cells,
    wherein the frit glass comprises lead oxide (PbO), boric oxide ($B_2O_3$), zinc oxide (ZnO), silicon dioxide ($SiO_2$) and barium oxide (BaO),
    and the lead oxide is 70–80 wt % of the frit glass.

2. The barrier in the color PDP as claimed in claim 1, wherein said frit glass is a frit glass of crystallinity.

3. The barrier in the color PDP as claimed in claim 1, wherein a black pigment is 0.4–0.6 wt % of the frit glass.

4. The barrier in the color PDP as claimed in claim 3, wherein said black pigment is formed of ferric oxide ($Fe_2O_3$) and cobalt oxide ($Co_2O_3$) in a predetermined proportion.

5. The barrier in the color PDP as claimed in claim 1, wherein said boric oxide is 8–13 wt % of the mixture.

6. The barrier in the color PDP as claimed in claim 1, wherein said zinc oxide is 7–12 wt % of the mixture.

7. The barrier in the color PDP as claimed in claim 1, wherein said silicon oxide is 3 wt % of the mixture.

8. The barrier in the color PDP as claimed in claim 1, wherein said barium oxide is less than 1 wt % of the total amount of the mixture.

9. The barrier in the color PDP as claimed in claim 1, wherein said lead oxide, said boric oxide, and said zinc oxide are 95 wt % of the mixture.

10. The barrier in the color PDP as claimed in claim 1, wherein said silicon oxide and said barium oxide are less than 4 wt % of the total amount of the mixture.

11. A color plasma display panel comprising:
   an upper substrate having a first array electrodes positioned thereon,
   a lower substrate having a second array of electrodes positioned thereon, and
   a barrier formed of frit glass between the upper substrate and the lower substrate, the frit glass comprising lead oxide, boric oxide, zinc oxide, silicon dioxide and barium oxide,
   wherein the frit glass melts at a first temperature during a first heating and melts at a second temperature during a second heating, the first temperature being at least about 100° C. less than the second temperature.

12. The color plasma display panel of claim 11, wherein the first temperature is about 370–380° C.

13. The color plasma display panel of claim 11, wherein the second temperature is at least about 500° C.

14. The color plasma display panel of claim 11, wherein the frit glass comprises lead oxide, boric oxide, zinc oxide, silicon oxide, and barium oxide.

15. The color plasma display panel of claim 14, wherein the frit glass comprises about 70–80% by weight lead oxide.

16. The color plasma display panel of claim 14, wherein the frit glass comprises about 8–13% by weight boric oxide.

17. The color plasma display panel of claim 14, wherein the frit glass comprises about 7–12% by weight zinc oxide.

18. The color plasma display panel of claim 14, wherein the frit glass comprises about 3% by weight silicon oxide.

19. The color plasma display panel of claim 14, wherein the frit glass comprises less than about 1% by weight barium oxide.

20. The color plasma display panel of claim 14, wherein the lead oxide, boric oxide, and zinc oxide together are at least about 95% by weight of the frit glass.

21. The color plasma display panel of claim 14, wherein the silicon oxide and barium oxide together are less than about 4% by weight of the frit glass.

22. The color plasma display panel of claim 14, wherein the frit glass comprises about 0.4–0.6% by weight black pigment.

23. The color plasma display panel of claim 22, wherein the black pigment comprises ferric oxide and cobalt oxide.

* * * * *